(12) United States Patent
Riddick et al.

(10) Patent No.: US 7,062,045 B2
(45) Date of Patent: Jun. 13, 2006

(54) MEDIA PROTECTION SYSTEM AND METHOD

(75) Inventors: Christopher J. Riddick, Herndon, VA (US); Lan Huu Tran, Reston, VA (US)

(73) Assignee: CLWT, LLC, Reston, VA (US)

( * ) Notice: Subject to any disclaimer, the term of this patent is extended or adjusted under 35 U.S.C. 154(b) by 821 days.

(21) Appl. No.: 09/947,641

(22) Filed: Sep. 6, 2001

(65) Prior Publication Data

US 2003/0044006 A1 Mar. 6, 2003

(51) Int. Cl.
*H04L 9/00* (2006.01)

(52) U.S. Cl. .................. 380/44; 380/201; 380/282; 705/51

(58) Field of Classification Search ........... 380/201, 380/282, 44; 705/51, 57, 64–65; 713/185, 713/193, 200–201
See application file for complete search history.

(56) References Cited

U.S. PATENT DOCUMENTS

| | | | |
|---|---|---|---|
| 5,319,705 A * | 6/1994 | Halter et al. ............... | 705/54 |
| 5,337,357 A | 8/1994 | Chou et al. | |
| 5,915,018 A * | 6/1999 | Aucsmith ................... | 380/201 |
| 5,917,912 A | 6/1999 | Ginter et al. | |
| 5,923,754 A | 7/1999 | Angelo et al. | |
| 5,987,607 A | 11/1999 | Tsumura | |
| 6,055,314 A * | 4/2000 | Spies et al. ................ | 380/228 |
| 6,061,451 A | 5/2000 | Muratani et al. | |
| 6,064,739 A | 5/2000 | Davis | |
| 6,070,799 A | 6/2000 | Ashe | |
| 6,101,476 A | 8/2000 | Kamatakis et al. | |
| 6,104,679 A | 8/2000 | Sollish | |
| 6,111,990 A | 8/2000 | Sugaya et al. | |
| 6,131,162 A | 10/2000 | Yoshiura et al. | |
| 6,154,571 A | 11/2000 | Cox et al. | |
| 6,158,005 A | 12/2000 | Bharathan et al. | |
| 6,161,179 A | 12/2000 | Seidel | |

(Continued)

*Primary Examiner*—Gilberto Barron
*Assistant Examiner*—Minh Dinh
(74) *Attorney, Agent, or Firm*—Joseph G. Seeber (57) ABSTRACT

In a media protection system and method, an original media item is encrypted before it is distributed. At the point of sale (POS) or point of distribution, the consumer presents his personal smart token to the clerk who inserts it into a POS reader along with a companion digital identifier (CDI™). The POS reader extracts a digital key from the CDI™ and merges it with the player list in the consumer's smart token. The POS reader then destroys the CDI™ and returns the smart token to the consumer. The digital key for the media item is now stored on the consumer's personal smart token, merged with the player identifiers for the players possessed by the user. When the user returns home, he inserts the media item into his player along with his smart token, and the digital key is extracted and used to decrypt the encryption key for the material that is stored on the media item itself. Then, the player decrypts the media item as it is played. The consumer may remove the smart token, and the encryption key is stored in the player. If the consumer wants to play the media item in a player other than the one on his list at the time he bought the media item, he inserts his smart token in the new player and its public key is transferred to his smart token. He then inserts the smart token into one of his currently authorized players and activates a "new player" function, which generates a new set of records on the smart token encrypted with the public key of the new player and accessible only to the new player.

17 Claims, 6 Drawing Sheets

U.S. PATENT DOCUMENTS

| | | |
|---|---|---|
| 6,167,136 A | 12/2000 | Chou |
| 6,182,215 B1 | 1/2001 | Tatebayashi et al. |
| 6,185,312 B1 | 2/2001 | Nakamura et al. |
| 6,185,686 B1 | 2/2001 | Glover |
| 6,195,766 B1 | 2/2001 | Maxwell et al. |
| 6,208,736 B1 | 3/2001 | Gotoh et al. |
| 6,209,092 B1 | 3/2001 | Linnartz |
| 6,215,745 B1 | 4/2001 | Sako et al. |
| 6,226,618 B1 | 5/2001 | Downs et al. |
| 6,229,896 B1 | 5/2001 | Gotoh et al. |
| 6,229,924 B1 | 5/2001 | Rhoads et al. |
| 6,243,468 B1 * | 6/2001 | Pearce et al. ............... 380/255 |
| 6,438,235 B1 * | 8/2002 | Sims, III ................... 380/285 |
| 6,438,447 B1 * | 8/2002 | Belka et al. ................ 700/214 |
| 6,708,272 B1 * | 3/2004 | McCown et al. ........... 713/151 |
| 6,728,379 B1 * | 4/2004 | Ishibashi et al. ........... 380/278 |
| 6,738,905 B1 * | 5/2004 | Kravitz et al. .............. 713/194 |
| 6,744,892 B1 * | 6/2004 | Akins et al. ................ 380/241 |
| 6,792,113 B1 * | 9/2004 | Ansell et al. ............... 380/284 |
| 6,859,789 B1 * | 2/2005 | Hayashi et al. ............... 705/50 |
| 6,980,660 B1 * | 12/2005 | Hind et al. ................. 380/282 |

\* cited by examiner

MEDIA PROTECTION SYSTEM AND METHOD

TECHNICAL FIELD

The present invention generally relates to a media protection system and method, and more particularly to a system and method for protecting data stored on or transmitted by electronic media, such as digital video disks (DVDs), compact disks (CDs), communications by satellite transmission, electronic mail over the Internet, electronic books and the like, from illegal copying or distribution.

BACKGROUND ART

The entertainment industry and others produce and distribute copyrighted material to consumers for profit. The artists who create this material receive payments for each copy of their work sold. Thus, efforts are made to protect the intellectual and creative property of these artists and publishers, and to ensure that the publishers and artists receive full remuneration for their work by minimizing the ability of organizations and individuals to circumvent the protections afforded copyright holders when their works are distributed to the public via electronic means.

There are two main classes of threat to the intellectual property rights of the publishers and artists. The first class is the pirate who obtains a copy of the original work (legally or illegally), duplicates it, and then distributes it for profit without permission from or payment to the copyright holders. The second class is the individual who acquires a copy of the work, and then makes copies to be distributed (for sale or for free) to others, such as friends and family. Both classes of threat are considered to be illegal and to deprive the copyright holder of compensation for the work. Although pirates have significantly greater resources at their disposal for acquisition and duplication of material, individuals can do significant financial damage by releasing an illegal copy to the Internet. In that case, the potential for lost revenue to the copyright holders may be significant—even greater than from pirates.

The pirate may obtain a copy of a work and apply significant resources to extract the copyrighted material. Once extracted, thousands of illegal copies can be produced. It may not be practical to prevent this, but it has been considered possible to tag the material with a watermark so that the source of the original copy can be determined. This technique can also be used to identify illegal copies. This aids in the apprehension and prosecution of pirates. Thus, the means for dealing with the pirate threat has been to place some barriers to copying, but to ensure that there is a mechanism for identifying pirated material and prosecuting those responsible.

The individual consumer, who may acquire a copy and make it available to thousands or millions of people simply by posting the material to the Internet, is a much more difficult threat to avert. Protections cannot be so cumbersome as to hamper the legitimate use of legally acquired material because that might cause consumers to refuse to purchase the material. On the other hand, the current system of unprotected distribution of material places no barriers in the way of the consumer who makes illegal copies. Also, once the copy is released, it is not possible to trace the source for prosecution.

Thus, there is a need not only for a system and method which will enable the apprehension and prosecution of illegal copiers, including pirates and individuals, but also for a system and method which will place a sufficient barrier to prevent the casual copier from illegally distributing intellectual property to friends and family and from posting such intellectual property to the Internet as well, while not imposing undue burdens on legitimate consumers. In that sense, a balance must be achieved.

Thus, such a system and method should provide legitimate consumers with the ability to purchase and enjoy copyrighted material in all of the environments in which they currently do so. For example, many people own a media player at home, one in their car, and maybe a third portable player they take with them for recreation. Current law permits such a person to purchase a single copy of a media item to be played on any of these devices. The consumer is permitted to make a copy for personal use only. However, the consumer may not copy the media item and distribute it to other family members, friends, or acquaintances, even if no money exchanges hands.

Today, the consumer can take the legitimate media item and play it in any of these devices without restriction. There is a need for a system and method which will provide media protection while ensuring that this is still possible, but which will make it impossible for the general consumer to make illegal copies of a media item to distribute to others. The system and method should also provide a mechanism which will permit the consumer to acquire other media players and to use those to play the media item, but which will restrict other people from playing the media item without the direct consent of the original purchaser.

DISCLOSURE OF INVENTION

The present invention generally relates to a media protection system and method, and more particularly to a system and method for protecting data stored on or transmitted by electronic media, such a digital video disks (DVDs), compact disks (CDs), communications by satellite transmission, electronic mail over the Internet, electronic books and the like, from illegal copying or distribution. In the context of the present invention, the term "media" refers to any mechanism or mode of data transfer using electronic means. This includes, but is not limited to, DVDs, CDs, radio and microwave transmissions, and electronic mail.

The media protection system is a distributed system composed of several subsystems, each providing an element of the overall copy protection and enforcement mechanism. The system and method of the present invention are based upon the premise that encrypting an original media item before it is distributed is the most secure approach to preventing illegal copying. The inventive system provides the elements necessary to manage the distribution of encrypted media, and to ensure that, when a legal copy is sold, it is accessible only to the legitimate purchaser of the copy or to a limited set of secondary parties as defined by the publisher.

In accordance with an embodiment of the invention, the consumer purchases a copy of a copyrighted work or media item at a retail store. A video DVD is an example, but the concept and operation of the invention apply equally to a music CD, electronic book, or any other digital media. As the consumer proceeds through the checkout, the clerk scans the media item for the price and detaches a Companion Digital ID™ (CDI) from the packaging. The consumer presents his personal smart token to the clerk who inserts it into a point of sale (POS) reader along with the CDI™. The POS reader extracts a digital key from the CDI™ and merges it with the player list in the consumer's smart token.

The POS reader then destroys the CDI™ and returns the smart token to the consumer. The digital key for the media item is now stored on the consumer's personal smart token merged with each of the player identifiers and inaccessible to any other person or device.

When the consumer returns home, he inserts the media item into his player along with his smart token, and the digital key is extracted and used to decrypt the encryption key for the material that is stored on the media item itself. Then, the player decrypts the media item as it is played. The consumer may remove the smart token, and the encryption key is stored in the player. If someone were to try to tamper with the player and attempt to extract the key, it would be erased. If the consumer wanted to play the media item in a player other than the one on his list at the time he bought the media item (e.g., he purchased a new player), he would insert his smart token in the new player and transfer its public key to his smart token. He then inserts the smart token into one of his currently authorized players and activates the NEW PLAYER function. This function generates a new set of records on the smart token encrypted with the pubic key of his new player and accessible only to his new player.

The discussion of the purchase of a media item raises the issue of how a consumer registers multiple devices that can read and decode the same media item. The system and method of the present invention provide a mechanism that embeds the decryption algorithm and a device-specific identifier in each player. Just as each network interface card today is initialized with a unique identifier, the system and method of the invention provide each player with a similar identifier. When the player is manufactured, it is packaged with a public/private key pair and a copy of the player's unique identifier. When the consumer purchases the player at the retail store, he presents his personal smart token to the player and the player's public key is added to the smart token's player cache. Thus, a database of identifiers and player public keys is incorporated on the consumer's smart token for use in the future when buying media.

When the consumer wishes to play the media item, he simply inserts the media item into the player and presents his smart token to the player's reader. The player extracts the merged digital key for the media item from the smart token and uses it to decode the encryption key stored on the media item itself. The encryption key is then cached on the player and used to decrypt the contents of the media item.

The consumer cannot share his smart token with someone else's player because the digital key is encrypted with the unique player public key from the consumer's own player. Anyone else's player will not be able to decode the digital key from the smart token, even if they are able to extract the encrypted digital key from the smart token. Likewise, if the consumer receives an illegal copy of a media item, it will not play on his player because the player's unique ID will not match an encrypted digital key from the smart token. Counterfeiting is not possible because the only source of the media private key is the CDI™ packaged with the original media item, and that is destroyed by the POS reader at the time of purchase. This makes mass distribution of counterfeited media extremely difficult due to the need to deal with the player's key and the media item's CDI™.

There are many possible uses of the invention in the marketplace. Although the invention will provide protection of DVD and CD recordings, as described above, its use can also be extended to almost any form of electronic media distribution, such as electronic book distribution, Internet software and data distribution, library loan and distribution, and secure transmission of information to selected recipients over broadcast systems. Thus, the features of the invention can be implemented in a data distribution system wherein a point of distribution takes the place of the POS discussed above, the CDI™ is transferred electronically to the point of distribution and is then transferred by suitable means (e.g., a reader similar to the POS reader described above) to the smart token of the user. The encrypted media item is transferred separately to the user.

Therefore, it is primary object of the present invention to provide a media protection system and method.

It is an additional object of the present invention to provide a system and method for protecting media, such as DVDs, CDs, electronic books, and the like, from illegal or unauthorized copying or distribution.

It is an additional object of the present invention to provide a system and method for protecting such media from illegal or unauthorized copying or distribution while not imposing undue burdens on legitimate consumers.

It is an additional object of the present invention to provide a system and method for protecting such media from illegal or unauthorized copying or distribution while preserving the ability of legitimate consumers to enjoy the protected material or subject matter in all of the environments in which they currently do so, and to use the protected material or subject matter in other media players acquired subsequent to purchase of the protected material or subject matter.

The above and other objects, and the nature of the invention, will be more clearly understood by reference to the following detailed description, the drawings and the appended claims.

BEST MODE FOR CARRYING OUT THE INVENTION

The invention will now be described in more detail with reference to the various figures of the drawings.

The media protection process begins at the publisher where the media are produced. Each copy of the media has an associated media label, $L_M$, and a unique public/private key pair, $K_{PubM}/K_{PrivM}$. Each copy of the media is encrypted using a unique key, $K_M$, associated with that particular media item and known only to the publisher. The encryption key, $K_M$, is then encrypted using the public key, $K_{PubM}$, and stored on the media item along with the protected work. The encryption key, $K_M$, is also referred to as the digital key for the media item. The media label, $L_M$, and the private key, $K_{PrivM}$, are written to a disposable media, such as a bar code strip or memory stripe card, attached to the packaging in which the media item is to be sold or distributed. These two items ($L_M$ and $K_{PrivM}$) are referred to as the Companion Digital ID™, or simply the CDI™.

Each copy of the media item is uniquely encrypted, and can only be read after the private key, $K_{PrivM}$, is used to decrypt the media key $K_M$. Since each media item uses a different encryption key, only the copy associated with that key can be read, and all other media items are still protected by their own encryption keys. If someone were to make multiple copies of a media item and distribute them, they would not be readable.

Figure 1:
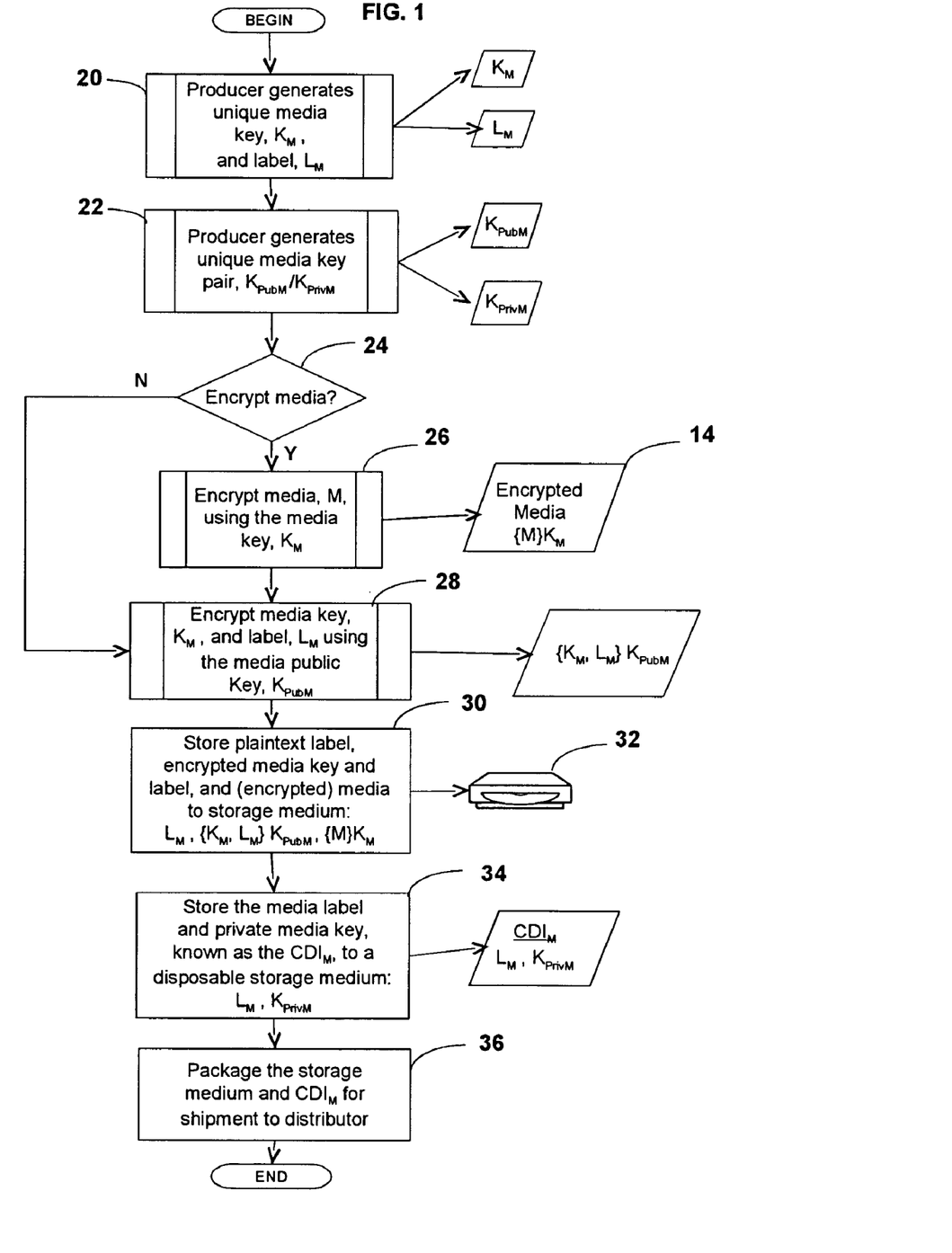
FIG. 1 is a flowchart of the process of producing protected media and the related keys.

FIG. 1 is a flowchart of the process of producing protected media and the related keys. Referring to FIG. 1, in order to protect a media item in accordance with the invention, the following steps are performed.

(1) The producer prepares a media master by first generating a media label, $L_M$, and a media key, $K_M$ (block 20).

(2) The producer generates a unique public/private key pair, $K_{PubM}/K_{privM}$, for the media item (block 22).

(3) If desired, the producer may encrypt the media item using the unique media key, $K_M$, known only to the producer (blocks 24 and 26), thereby producing an encrypted media item.

(4) The producer encrypts the media key, $K_M$, and the label, $K_L$, using the media's public key, $K_{PubM}$, to get the following: $\{K_M, L_M\}K_{PubM}$ (block 28).

(5) The producer destroys the media key, $K_M$, and stores a plaintext copy of the media label, $L_M$, and the encrypted media key and label, $\{K_M, L_M\}K_{PubM}$, on the media item to get the following: $L_M, \{K_M, L_M\}K_{PubM}$; if the media item was encrypted with the media key, $K_M$, in step (3) above, then the producer also writes the encrypted contents to the media item (block 30).

(6) The producer writes the media private key, $K_{PrivM}$, and the media label, $L_M$, to a disposable medium to be incorporated into the packaging in which the media item will be distributed or sold (block 34). The private key is no longer needed, but may be archived for future retrieval should it be necessary to recover a media item encrypted with this key pair. The combination of media private key and media label on the disposable medium is called the Companion Digital ID™ (CDI), or simply CDI™, as stated above.

(7) The producer generate a media package insert, containing the CDI™, to be used at the POS, and packages the media item with its disposable medium for shipment to the distributor (block 36).

Figure 2:
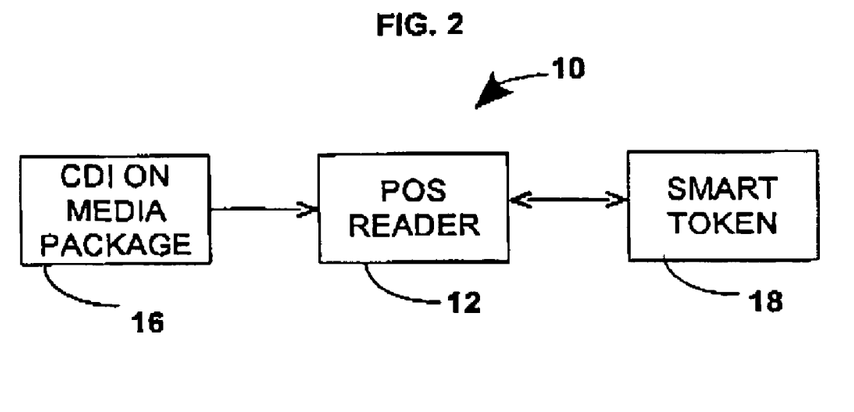
FIG. 2 is a diagrammatic representation of the components of the inventive system as provided at a point of sale (POS).

Upon shipment of the media item and its packaging to the POS, it is displayed for purchase by consumers. FIG. 2 is a diagrammatic representation of the components of the inventive system as provided at the POS.

Referring to FIG. 2, in accordance with the invention, the POS system 10 includes a POS reader 12 located at the POS. The encrypted media item 14 is displayed in its media packaging with its CDI™ 16 located on the package. A consumer desiring to purchase the encrypted media item 14 will carry a smart token 18 for use at both the POS and the POU.

The inventive system and method ensure that the CDI™ is securely transferred to the purchaser's smart token by the POS reader 12, and encrypted using the public keys of the players owned by the consumer, thus eliminating the opportunity of the purchaser to make multiple copies since the CDI is locked on the smart token and only authorized players will be able to access the media CDI. The system and method of the invention, as implemented at the POS, will now be described with reference to FIG. 2, as well as to FIG. 3, which is a flowchart of the process of activation of the media at the POS, and FIG. 4, which is a diagrammatic representation of a smart token used in the present invention.

Figure 4:
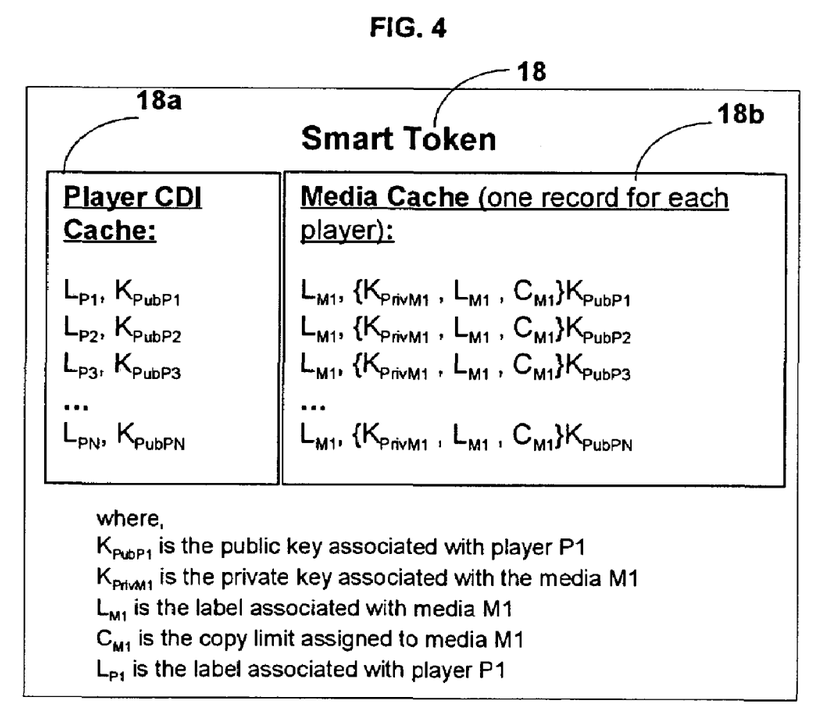
FIG. 4 is a diagrammatic representation of a smart token used in the present invention.

(1) The consumer enters a store with his smart token 18 containing a cache 18a of public keys, $K_{PubPN}$, for all players he owns.

(2) The consumer selects a media item (block 40 of FIG. 3), and presents its package $CDI_M$ 16 (which contains the media label and the media private key) to the POS reader 12, and inserts his smart token 18 into the reader 12.

Figure 3:
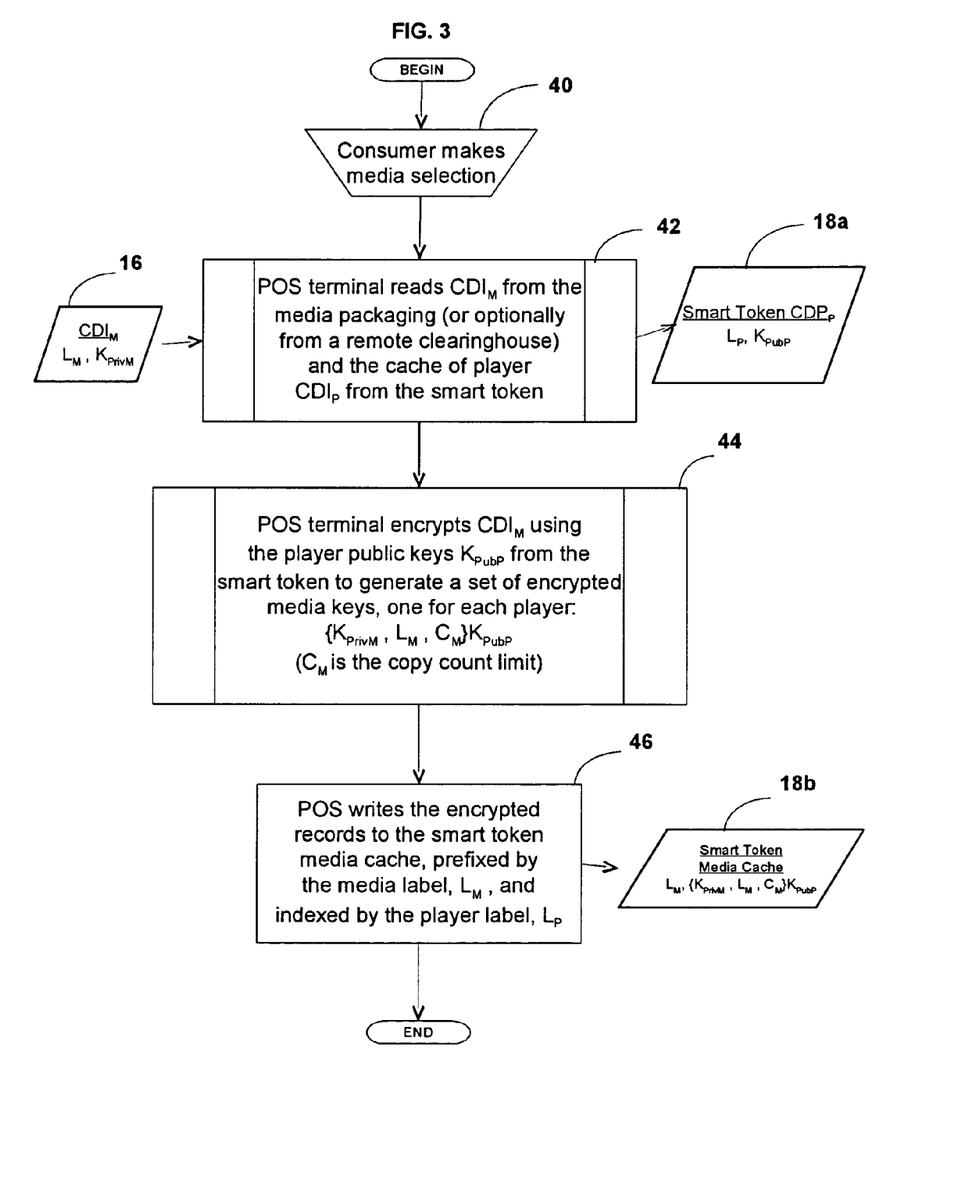
FIG. 3 is a flowchart of the process of activation of the media at the POS.

(3) The POS reader 12 reads the $CDI_M$ and extracts the media label, $L_M$, and the media private key $K_{PrivM}$ (block 42).

(4) The POS reader 12 also reads the player cache 18a from the smart token 18 (block 42), and encrypts the media private key, $K_{PrivM}$, the media label, $L_M$, and the copy count, $C_M$, using the public key of each player to generate a set of encrypted keys as follows: $\{K_{PrivM}, L_M, C_M\}K_{PubP}$ (block 44). This set is then written back to the media cache 18b of the smart token 18, and is indexed using the media label $L_M$, and the player label, $L_P$, as indices (block 46). The count, $C_M$, is reserved for use when copying a media item (block 46). The count determines the number of legitimate copies which may be made from the original media item purchased by the consumer. This number is configurable by the DVD manufacturer and defaults to 3.

(5) The $CDI_M$ is then destroyed at the POS to prevent illegal copying.

Figure 5:
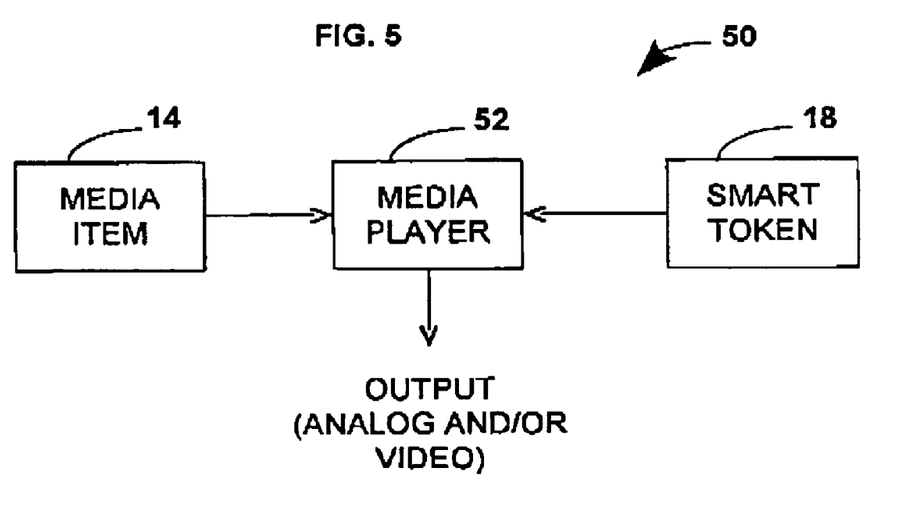
FIG. 5 is a diagrammatic representation of the components of the inventive system as provided at a point of use (POU).

Once the consumer purchases the media item at the POS, he transports it to the point of use (POU). FIG. 5 is a diagrammatic representation of the components of the inventive system as provided at a POU.

As seen in FIG. 5, the POU system 50 includes the consumer's media player 52 for playing the media item 14 with input from the consumer's smart token 18. The method and operation of the present invention at the POU will now be described with reference to FIG. 5, and to FIG. 6, which is a flowchart of the process of media playback at the POU.

Figure 6:
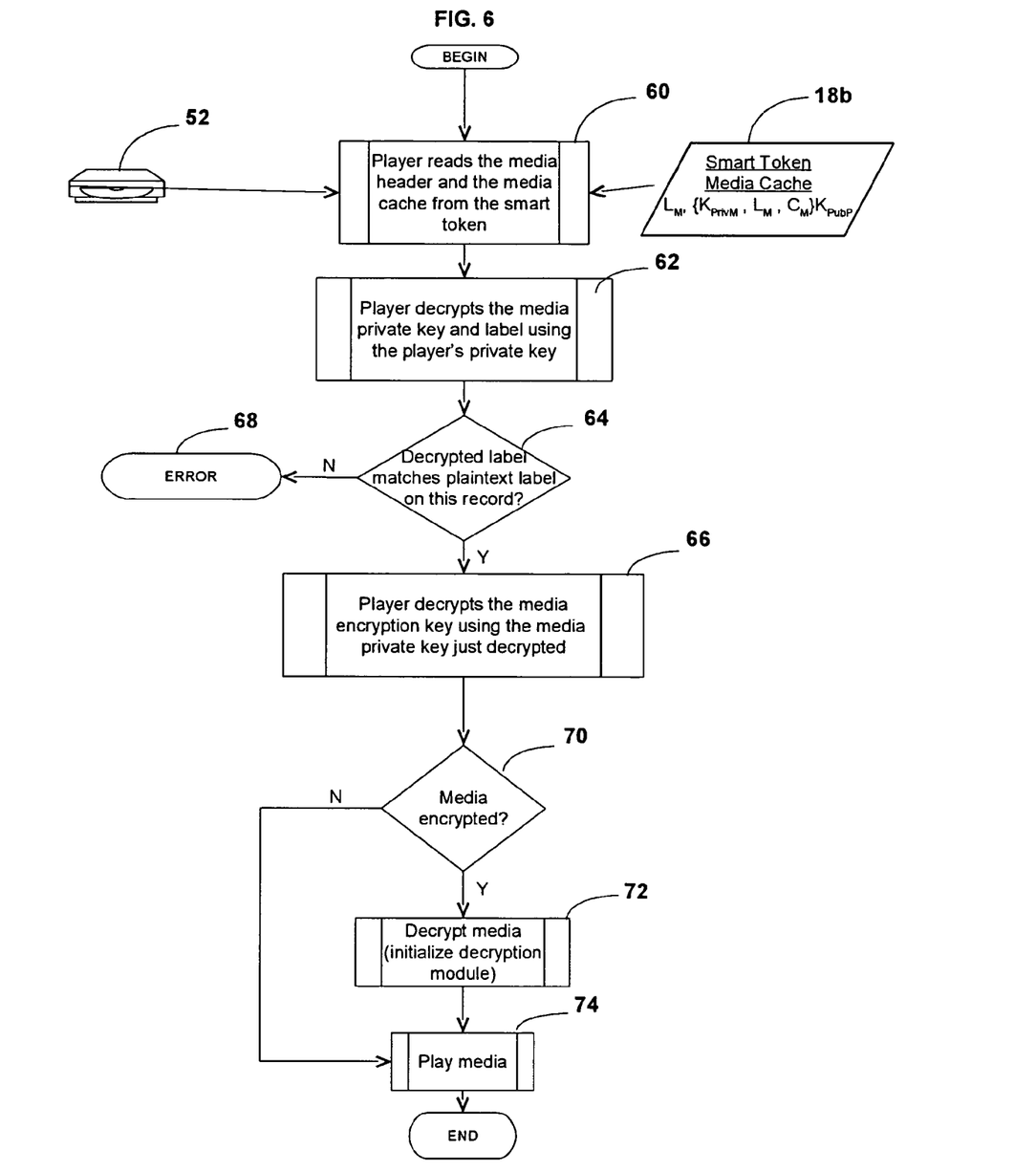
FIG. 6 is a flowchart of the process of media playback at the POU.

Operation of the system and method of the present invention at the POU proceeds as follows.

(1) When the consumer wishes to play the media item 14, he inserts it into his player 52 along with his smart token 18. The player 52 opens the smart token 18, and searches the media cache for a match with the media item label, $L_M$, read from the header of the media item (block 60).

(2) The player 52 may find one or more entries in the cache for the media label, but only the one with the player's label, $L_P$, will be used. The player 52 uses its internal private player key, $K_{PrivP}$, to decrypt the media encryption key, $K_{PrivM}$, retrieved from the smart token media cache to obtain the following: $\{\{K_{PrivM}, L_M, C_M\}K_{PubP}\}K_{PrivP}=K_{PrivM}, L_{cM}$ (block 62). The count, $C_M$, retrieved from the decrypted record is not used during playback, but is reserved for use when copying the media item 14. The count determines the number of legitimate copies which may be made from the original media item 14 purchased by the consumer.

(3) If the decrypted media label $L_M$ from the smart token 18 matches the label from the media item 14 itself, then playing may proceed because the decryption was successful (block 64).

(4) The $K_{PrivM}$ is used to decrypt the media key read from the same record on the smart token 18 to obtain the following: $\{\{K_M, L_M\}K_{PubM}\}K_{PrivM}=K_M, L_M$ (block 66).

(5) If the media item 14 was encrypted, then $K_M$ is used to decrypt the contents of the media item 14 before or during playback (blocks 70 and 72), and the media item 14 is then played (block 74).

The system and method of the present invention require that all players, such as player 52 (FIG. 5) have an embedded Companion Digital ID, $CDI_P$, that is generated at the time of manufacture of the player 52 and permanently stored in a secure memory in the player 52. The $CDI_P$ contains a player label, $L_P$, and a public/private key pair, $K_{PubP}/K_{PrivP}$. Anyone may insert his or her smart token 18 into the player 52 and load the player's public key onto the smart token 18 using the RETRIEVE CDI function. Once the public key is on the smart token 18, the smart token may be taken to any POS reader 12 when purchasing the media item 14, and have the media item's private key encrypted using the player's public key, as described above. This permits anyone who purchases a legitimate copy of a media item 14 to play it on this particular player 52.

In the preferred embodiment of the invention, the embedded CDI™ is implemented in a tamperproof hardware module which can be either permanently wired into the player circuitry, or portable and plugged in using an industry-standard device interface, such as PCMCIA or USB. Regardless of the mechanism used to store and protect the $CDI_P$, all embedded $CDI_P$ subsystems must contain the following functionality in a self-contained, tamperproof package:

(1) Store the player CDI on the subsystem along with its associated public key. The information stored will be: $L_P$, $K_{PrivP}$, $K_{PubP}$. This includes the player label, its private key, and its public key.

(2) Support the following functions when commanded through the external interface: RETRIEVE CDI, INITIALIZE DECRYPT, and DECRYPT. RETRIEVE CDI returns the player label and the public key portion of the key pair to the requesting device. INITIALIZE DECRYPT receives an encrypted media key, decrypts it using the internal private key, and then places the media key into the decryption circuitry in preparation for decrypting the data stream to follow. The DECRYPT function takes a stream of bytes off the input register and decrypts them using the initialized decryption circuitry in the tamperproof subsystem.

(3) Retain the media key in internal memory on the subsystem until power is removed or the next INITIALIZE DECRYPT command is received.

(4) Perform decryption functions using any standard encryption algorithm, such as AES, DES, or Triple DES.

Figure 7:
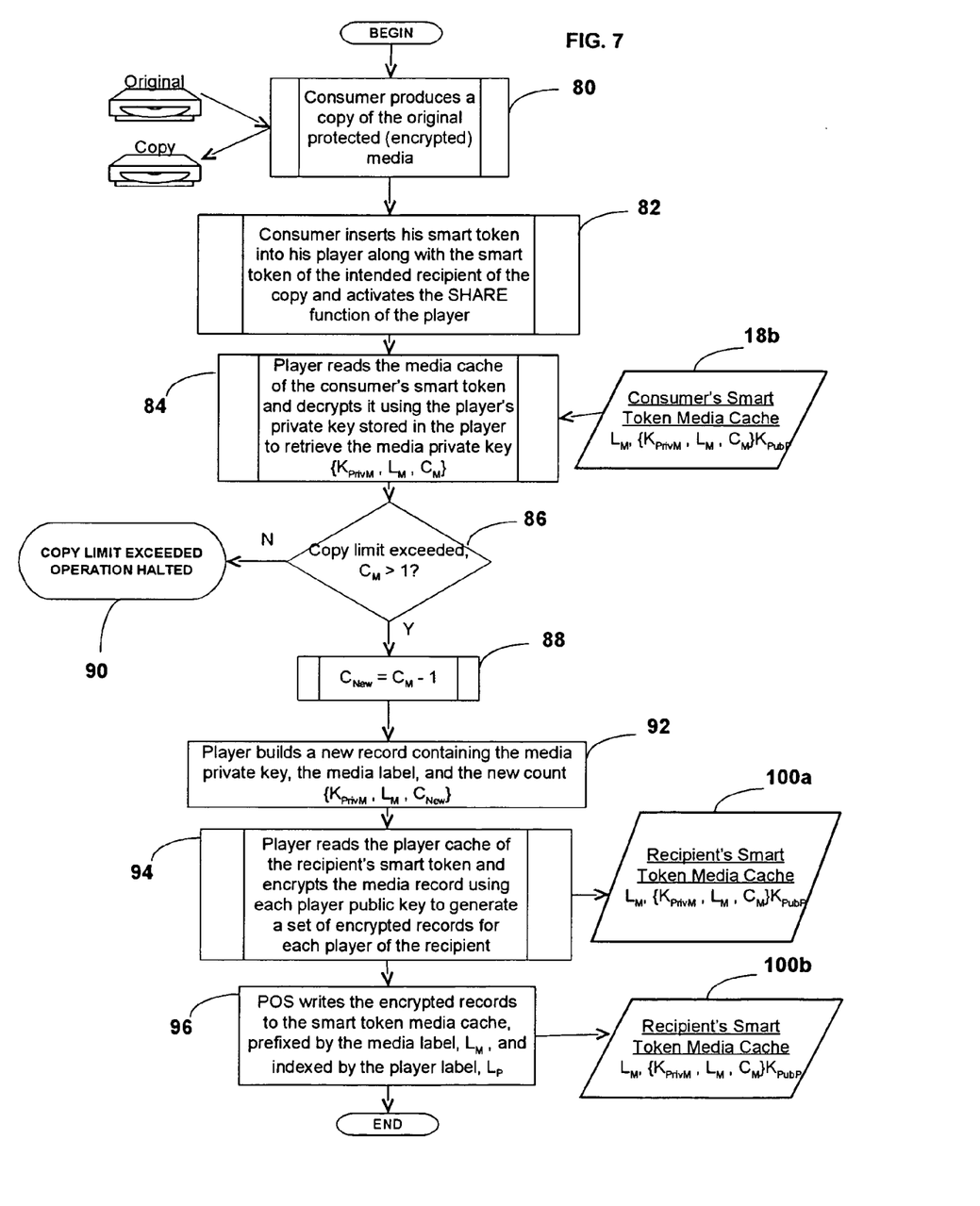
FIG. 7 is a flowchart of the process of fair use copying in accordance with the present invention.

The system and method of the present invention permit consumers to make copies of a media item for backup and personal use, or to share a media item or items with a limited number of persons (in the example given above, limited to three copies). This maintains a balance between the rights of the intellectual property owner under copyright law and the rights of the purchaser to use the products. Referring to FIG. 7, personal use copying works in the following manner:

(1) A consumer who owns a legitimate copy of a media item 14 (FIG. 5) wishes to make a copy for a friend to view. The consumer understands that he is limited to only three such copies. The consumer produces a copy of the media item 14 using any generally available copy utility for a personal computer or other duplication device (block 80). The copy will be indistinguishable from the original.

(2) The consumer must now transfer the right to view the media item 14 from his smart token to his friend's smart token 18. This is done using the consumer's player 52 by inserting both tokens 18 into the player 52 and pressing the SHARE button or activating the SHARE function (block 82).

(3) The player 52 reads the media cache 18b (FIG. 4) from the consumer's smart token 18 and locates the player's own copy of the encrypted media key record, $\{K_{PrivM}, L_M, C_M\}_{KpubP}$ (block 84). Since this player 52 is the legitimate user of this record, it may decrypt this record using its private key, stored only in the player's protected memory.

(4) Once decrypted, this record reveals the private key for the media item, the media label, and the media count. The player 52 first checks the count (block 86). If it is greater than or equal to 1, then it decrements the count, and proceeds (block 88). If the count is zero, then the consumer has already exhausted his legal copy limit, and the key duplication process is immediately terminated (block 90).

(5) The player 52 builds a new record containing the media private key, the media label, and the new count (block 92). The player 52 then reads the player cache 18a from the friend's smart token 18, and uses the public keys from this cache to generate a set of encrypted records for this media item, and stores them in media cache 100a of the friend's smart token in the same manner as was described above (blocks 94 and 96).

(6) Now, the friend's smart token has a set of encrypted keys for the media item 14 to match each player that he owns, except for the fact that the media count has been decremented by 1. If the friend were to make a copy of the media item 14 and to pass it on to someone else, the count would again be decremented, and ultimately the legal copy limit would be reached and further copying prevented.

The following features fall within the scope of the inventive system and method described above:

(1) a system to protect the transmission and storage of intellectual property;

(2) the provision of a Companion Digital ID™ or CDI™ associated with any media item or intellectual property in electronic form;

(3) the transmission of the CDI™ via a medium which can be destroyed once it is read by a point of sale (POS) reader;

(4) the transmission of the CDI™ via electronic means using secure communications over the Internet, or over another communications system, from a secure clearinghouse to a POS reader, thereby further increasing the security of the transfer of the CDI™ to smart token;

(5) the use of a POS reader to complete the transfer of the CDI™ to a smart token, and then to destroy the CDI™ media item to prevent unauthorized copying;

(6) the use of a smart token to store the cache of player public keys owned by the consumer and a cache of encrypted CDIs for each media item (e.g., CDROM or DVD) owned by the consumer;

(7) the use of an embedded private key from a public/private key pair in the electronic circuitry or read-only memory of each player or playback device for the purpose of decrypting the CDI™ from the smart token media cache;

(8) the use of a tamperproof module with an industry standard interface (such as PCMCIA or USB) that can be embedded in the circuitry, or plugged into an interface, of the player, such module performing the actual data or media decryption function using a supplied encrypted media key, and containing the player private key which is used to decrypt the media key in order to initialize the decryption circuitry, and such module performing the following functions: RETRIEVE CDI, INITIALIZE DECRYPT, and DECRYPT;

(9) the use of the player or playback device public key to encrypt the CDIs for each media item owned by the consumer and stored on the consumer's smart token;

(10) the use of the encrypted CDIs and a maximum copy count stored on the smart token to limit the number of copies that may be generated by a consumer for any player other than his or her own player; and (11) the provision of an intellectual property and media protection system or method consisting of four elements: the producer's media encryption key and associated public/private key pair for securing the media, the special POS reader to transfer the CDI™ from the media package or a clearinghouse to the consumer's smart token, the smart token itself used to maintain the cache of player public keys and encrypted CDIs for all authorized media, and the special players or playback devices with embedded private keys from a public/private key pair used to decrypt the CDIs from the smart token cache, and then to decrypt and play back the protected media item.

While preferred forms and arrangements have been shown in illustrating the invention, it is to be understood that various changes and modifications may be made without departing from the spirit and scope of this disclosure.

The invention claimed is:

1. A method for protecting intellectual property, comprising the steps of:
   generating a unique media key;
   generating a public media key;
   encrypting the intellectual property using the unique media key;
   encrypting the unique media key using the public media key;
   combining the encrypted intellectual property and the encrypted unique media key for distribution to a user;
   generating a private media key for use by the user in decrypting the unique media key;
   generating a media label; and
   combining the media label and the private media key to form a companion digital identifier;
   wherein the companion digital identifier is stored on a disposable medium and is copied to a smart token of the user at a point of distribution, and wherein the disposable medium is destroyed at the point of distribution after copying of the companion digital identifier to the smart token of the user.

2. The method of claim 1, further comprising the step of: providing the private media key to the user separately from the combined encrypted intellectual property and encrypted unique media key.

3. The method of claim 1, wherein the uses the decrypted unique media key to decrypt the intellectual property.

4. The method of claim 1, wherein the encrypted intellectual property and the encrypted unique media key are stored on a media item, and wherein the private media key is stored on a separate medium for distribution with the media item.

5. The method of claim 4, wherein the separate medium is attached to packaging in which the media item is placed for distribution.

6. The method of claim 4, further comprising the step of generating a media label, and wherein the media label is stored with the private media key on the separate medium.

7. The method of claim 1, wherein the companion digital identifier is provided to the user separately from the combined encrypted intellectual property and encrypted unique media key.

8. The method of claim 7, further comprising the step of encrypting the companion digital identifier at the point of distribution prior to distribution to the user.

9. The method of claim 8, wherein the companion digital identifier is encrypted using a public key unique to a player of the user, the public key being contained on and read from a smart token provided by the user.

10. The method of claim 9, wherein the user plays the intellectual property in the player of the user by inserting the smart token into the player, and wherein the player uses a private key of the player to decrypt the companion digital identifier, thereby obtaining the media label and the private media key.

11. A system for protecting intellectual property, comprising:

a smart token carried by a user and containing a public key;

a media item containing intellectual property which is encrypted using a unique media key prior to storage on the media item, wherein the unique media key is encrypted using a public media key and is distributed with the intellectual property;

a storage medium which contains a companion digital identifier including a private media key for decrypting the unique media key, and which is distributed with, but separate from, the media item; and a reader for reading information from the smart token and the storage medium, for processing the information read from the smart token and the storage medium to obtain resultant data, and for storing the resultant data on the smart token;

wherein the storage medium containing the companion digital identifier is disposable, the companion digital identifier is copied to the smart token at a point of distribution, and the disposable storage medium is destroyed at the point of distribution after copying of the companion digital identifier to the smart token.

12. The system of claim 11, wherein the smart token also contains information relative to at least one media player possessed by the user, the reader reads the public key from the smart token and the companion digital identifier from the storage medium, and encrypts the companion digital identifier using the public key to generate at least one encrypted media key, one each said at least one player possessed by the user.

13. The system of claim 12, wherein the reader writes said generated at least one encrypted media key to said smart token of the user.

14. A method for distributing a private media encryption key used for protection of intellectual property, comprising the step of:
   generating the private media encryption key used for protection of the intellectual property;
   providing a companion digital identifier containing the private media encryption key;
   storing the companion digital identifier on a disposable medium;
   copying the companion digital identifier, including the private medium encryption key, onto a smart token of a user at a point of distribution for distribution thereof; and
   destroying the disposable medium at the point of distribution after the companion digital identifier is copied onto the smart token of the user.

15. The method of claim 14, wherein the companion digital identifier is provided to the user separately from encrypted intellectual property and an encrypted unique media key.

16. The method of claim 15, wherein the companion digital identifier is encrypted using a public key unique to a player of the user, the public key being contained on and read from a smart token provided by the user.

17. The method of claim 16, wherein the user plays the intellectual property in the player of the user by inserting the smart token into the player, and wherein the player uses a private key of the player to decrypt the companion digital identifier, thereby obtaining a media label and the private media encryption key.

* * * * *